INVENTOR.
EMIL BORYSKO
BY
ATTORNEY

United States Patent Office 3,376,869
Patented Apr. 9, 1968

3,376,869
SURGICAL COLLAGEN FILM FORMED FROM RANDOM LENGTHS OF COLLAGEN TAPES OR STRANDS
Emil Borysko, Somerville, N.J., assignor to Ethicon, Inc., a corporation of New Jersey
Filed Feb. 21, 1964, Ser. No. 346,438
5 Claims. (Cl. 128—334)

This invention relates to a collagen film that is useful in surgery, and to a method of manufacturing such a film.

For the sake of clarity, the terms used herein are defined as follows:

The term "swollen collagen fibril," as used herein, means a thread-like collagen structure that has been swollen in acid solution to a diameter of about 2,000 to about 90,000 Angstrom units.

The term "monofilament," as used herein, means a single thread of oriented collagen fibrils as extruded through a single orifice in a spinnerette.

The term "multifilament," as used herein, means a group of individual separate collagen filaments extruded through a spinnerette.

The term "tape," as used herein, means a group of individual monofilaments that have been united to form a unitary structure that is ribbon-like in shape.

The term "strand," as used herein, means a group of individual monofilaments that have been united to form a unitary structure of circular cross-section.

The term "film" as used herein, means a sheet having substantially greater area than thickness.

The repair of soft body tissues, such as the liver and spleen, has always been a difficult problem for the surgeon because attempts to suture such tissues frequently result in the suture tearing out. The cross-sectional area of the suture is so small that the force applied by the surgeon to position and tie the suture may cut through the soft tissue being repaired. Even in those instances where the surgeon may succeed in placing the sutures without undue damage to the soft tissue, the sutures may tear out before healing is complete. It has become the practice, therefore, in operations of this type, and also in the repair of body defects where maximum strength is required, to suture through a sheet of absorbable material such as fascia lata which holds the suture until healing has taken place. Unfortunately thin sheets of fascia lata also have poor tear strength and the uniformity of this material which is derived from animal sources leaves much to be desired.

Attempts have been made to provide a substitute for fascia lata by preparing a dispersion of collagen and casting a film. It is a disadvantage of collagen films prepared by this procedure that they do not have the desired tear strength.

It is an object of the present invention therefore to provide a collagen film having high-tear strength that is useful in surgery.

While the present invention is not to be limited to any particular theory of operation the stitch tear strength of collagen films is believed to be a function of the arrangement of the collagen fibrils in the films. It has been demonstrated that when films are made by casting a dispersion of swollen collagen fibrils, the fibrils become arranged in broad sheets in which they lie parallel to the surfaces of the film but are randomly oriented with respect to each other. Fibers, consisting of bundles of fibrils oriented parallel to each other, are lacking entirely. The films of the present invention are made to contain interlocking and anastomosing bundles of monofilaments arranged in a pattern somewhat similar to that found in animal skins. Such a film is made by drying down a dispersion of swollen collagen tapes (or strands) in which the tapes have not lost their identity. The film has a considerably increased tear strength. The dispersion may be made by swelling untanned collagen tape in any suitable acid-swelling medium without mechanical agitation.

The object of this invention may be realized by extruding a homogeneous dispersion of pure swollen collagen fibrils into a dehydrating bath to form a multifilament tape. The multifilament tape so obtained, or bundles of multifilament, may be cut to various lengths and placed on a suitable support such as a screen to build up a layer of collagen filaments that are randomly aligned in planes parallel to the surface of the supporting screen. Alternatively, the collagen multifilament may be further processed to obtain a strand or tape the individual monofilaments of which have a longitudinal axis substantially parallel with the longitudinal axis of the strand or tape. Such strands or tapes are equally suitable for forming a layer of collagen supported by the screen. The layer of collagen monofilaments, strands, or tapes or a mixture thereof is then laminated and bonded together into a unitary structure by immersing the collagen layer and its supporting screen in a dilute aqueous acid solution. Preferably, the dilute aqueous acid solution has dispersed therein swollen collagen fibrils. After the dilute aqueous acid solution has swollen the layer of collagen, the screen is raised out of the bath and air-dried in an atmosphere containing ammonia gas. The dried and neutralized film may then be washed with water to remove soluble ammonium salts, tanned to improve its wet strength, dried and then removed from its supporting screen. The invention will appear more clearly from the following detailed description when taken in connection with the accompanying drawings, which show, by way of example, preferred embodiments of the invention idea.

Figure 1:
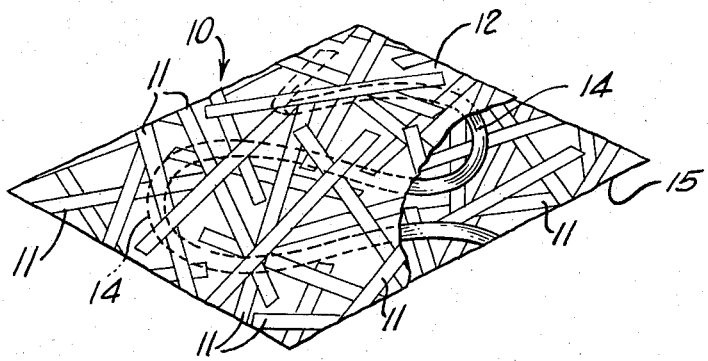
FIGURE 1 is a plan view, partly broken away, of the collagen film of the present invention.
Figure 2:
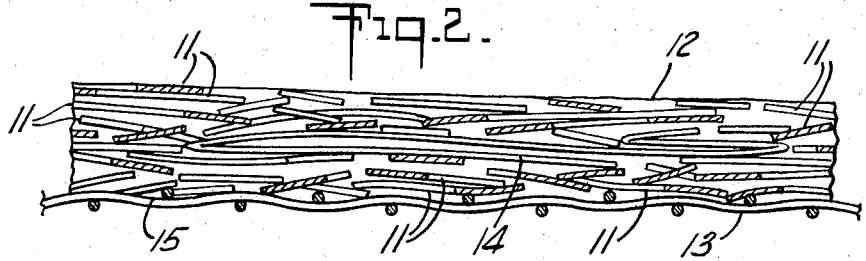
FIG. 2 is an enlarged edge view in cross-section of the film supported on a screen.
Figure 3:
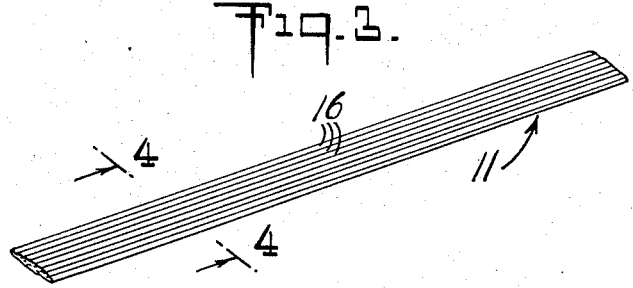
FIG. 3 is an enlarged perspective view of a section of collagen tape.
Figure 4:
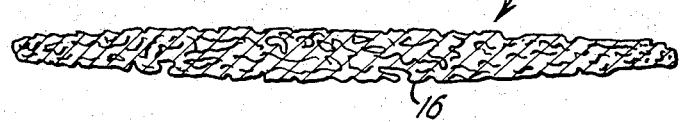
FIG. 4 is an enlarged sectional view of the collagen tape taken along the line 4—4 of FIG. 3.

With reference to FIG. 1 there is disclosed the structure of a collagen film 10 composed of a multiplicity of collagen tapes 11 randomly arranged in the plane defined by the surface 12 of the film. As best indicated in FIG. 2, which greatly exaggerates for the purpose of clarity, the separation between adjacent segments of tape; the tape segments are substantially parallel to the surfaces of the screen 13 and the film 12. In one embodiment of the present invention, a long segment of tape 14 may be randomly coiled and placed so that it is centrally located within the film between the top surface 12 and the bottom surface 15 thereof. The tape segments of which the film 10 is composed may conveniently be from about ⅛ inch to about ¼ inch in width and are visible to the naked eye. The orientation of the tape segments within the film will, however, be more vividly apparent if the film is examined under a polarized light due to the intrinsic birefringence of the monofilaments resulting from the rectilinear arrangement of the fibrils parallel to the longitudinal axis of the monofilaments. The parallel arrangement of the collagen monofilaments 16 in the tape 11 will be readily understood from FIGS. 3 and 4. The collagen fibrils that make up the monofilaments 16 have the typical banding at intervals of approximately 640 Angstrom units that is characteristic of collagen fibrils in their natural state.

The manufacture of a collagen film having outstanding tear strength will be illustrated by the following examples. Throughout the specification all quantities are expressed in parts by weight unless otherwise indicated.

Example I 500 parts of the dispersion of swollen collagen fibrils described in Example II of U.S. Patent No. 2,920,000 is diluted with 3500 parts of water. The collagen dispersion prior to dilution contained 0.86% collagen solids and 0.38% cyanoactic acid in equal parts by volume water and methanol.

It has been empirically determined that when using a screen having an area of about 180 square inches, approximately one gram of collagen tape is required for each mil thickness of the finished stitchable film. Ten grams of untanned collagen tape prepared as described in U.S. Patent No. 3,114,372 is cut into random lengths ranging from about 1 centimeter to 10 centimeters and laid on a stainless steel screen measuring 10 inches by 18 inches. The pore size of the screen is not critical and may vary from about 100 square mils to about 10,000 square mils. The cuttings are dropped onto the filming screen so that they are uniformly distributed and randomly oriented. A long length of collagen tape (about 3 meters) is randomly coiled over the cuttings. Another 10 grams of collagen tape is cut into random length and distributed over the coiled tape and the screen surface as before. The long length of tape in between two layers of short lengths serves to minimize drifting of the tape segments in the next step of the process.

The screen with the tape cuttings on it is placed in a large tray. A sufficient quantity of ethanol (95%) is poured into the tray *outside* of the screen so that it wells up through the screen and wets the tape. This will reduce bubble formation from entrapped air when the dilute collagen dispersion is introduced. It is essential to avoid an excess of ethanol in this step. Next, the dilute collagen dispersion described above is poured into the tray *outside* of the screen so that it wells up through the screen without disturbing the distribution or orientation of the collagen tape cuttings. The depth of the dilute dispersion over the screen should be about 100 times the desired thickness of the finished film. Within a few minutes, the collagen tape begins to swell and becomes translucent. When the tape is sufficiently swollen (about 2 hours) the filming screen with the swollen tapes supported thereon is removed from the tray and placed over a second tray containing 20 parts of concentrated aqueous ammonium hydroxide. This causes the collagen fibrils to deswell from the bottom up, i.e., the collagen fibrils that are in contact with the stainless steel screen deswell first. The large amount of free fluid liberated as the collagen fibrils deswell drains through the screen and serves to compact the deswollen fibrils against the screen. For films 10-15 mils thick this process may be completed overnight.

The screen is uncovered and removed from the deswelling tray. Excess moisture is removed by placing the bottom of the screen on sufficient thicknesses of cotton towel. When it is seen that excess fluid has been removed, the screen may be propped up so that the film can dry from both surfaces. Drying can be accelerated by the use of a fan (without heat).

After drying, the film measures about 15 mils in thickness. It may be tanned while still attached to the screen to preserve its flatness. The film is washed on the screen and then immersed for 2 hours in a solution containing 3 parts of formalin (36% $CH_2O$) in 100 parts of water. The film and its supporting screen is removed from the tanning bath and air-dried. The film should not be removed from the screen until it is completely dry after tanning.

Example II

Untanned collagen tape is swollen in a dilute aqueous acid dispersion of collagen fibrils as described in Example I above. After 15 minutes the supporting screen is placed over a pan containing about 10 parts of ammonium hydroxide to simultaneously deswell the collagen fibrils and remove excess fluid. After 2 days a thick mat of deswollen collagen fibrils remains on the screen. This is allowed to dry for 2 more days and then excess fluid is blotted out by placing the mat between layers of cotton towels for an additional day. The mat is finally dried to the translucent (glass) state by tacking it to a curtain stretcher. The dried sheet is approximately 125 mils thick. When examined in polarized light both microscopically and macroscopically, it is seen that the sheet is composed mainly of randomly arranged collagen tapes. A small portion of the sheet is tanned with formaldehyde. It has good stitch tear properties.

Example III

Twenty parts of collagen strands are swollen in 4,000 parts of the collagen dispersion described in Example I above. Swelling is done without agitation so that the collagen fibrils remain organized in parallel bundles. The swollen strand is spread on a filming screen and suspended over a tray containing about 10 parts of ammonium hydroxide. The fibrils deswell and most of the free fluid drains off overnight. After washing the wet mat with water, it is permitted to dry into a translucent film ranging from five to ten mils in thickness. A portion of the film is tanned with formaldehyde as described in Example I above. When wet, it has good stitch tear properties. Examination in polarized light reveals that the collagen is organized as randomly arranged strands.

Example IV

The procedure of Example III is followed with 10 parts of collagen tape and 4,000 parts of the dilute dispersion of swollen collagen fibrils described in Example I. The tape is cut into lengths averaging about 2 inches. The film is lightly tanned with a 1% solution of formalin in water for about one hour. The dry film obtained is brittle but, when soaked in water for about 15 minutes, the stitch tear strength is obviously superior to that of films made by casting a dispersion of swollen fibrils.

Stitch tear determinations are made on the Scott tester. The film is cut into strips measuring ½ inch by 2½ inches. One end of each strip is fastened in one of the clamps of the Scott tester. The other end is fastened to a hook made of wire about 25 mils in diameter which is held securely in the other clamp of the tester. The film strips are perforated on their center lines ¼ inch in from the edge. The films are soaked in water for 15 minutes before testing. A film made by the casting process is used as a comparative control. The results are tabulated in the following table:

|  | Control | Experimental |
| --- | --- | --- |
| Dry Thickness | 15 mils | 8 mils. |
| Wet Thickness | 34 mils | 9 mils. |
| Tear Strength | 2.3 lbs | 3.0 lbs. |

In all instances, the hook tears directly out of the control film parallel to the stress direction. In the experimental films, the tear in the film is at right angles to the stress direction.

On a per mil dry thickness basis, the control films averaged 0.153 lb. tear strength while the experimental films averaged 0.450 lb., a threefold difference.

What is claimed is:

1. A collagenous film for use in surgical repair of soft body tissues having a tear strength of about 0.45 pound per mil of thickness, comprising a multiplicity of collagen tapes, each tape composed of individual collagen monofilaments united into a flat configuration, said tapes ranging in length from about 1 centimeter to about 3 meters, randomly disposed in a plane parallel to the surface of the film; said tapes intersecting each other and being bonded together by collagen fibrils at their contiguous surfaces form a unitary structure.

2. A tanned collagenous film according to claim 1.

3. A collagenous film according to claim 1 free of elastin.

4. A collagenous film for use in surgical repair of soft body tissues having a tear strength of about 0.45 pound per mil of thickness comprising a multiplicity of collagen strands ranging in length from about 1 centimeter to about 3 meters, each strand composed of individual collagen monofilaments arranged into a cross-section, circular in configuration, said strands being randomly arranged in the plane defined by the film and intersecting each other and being bonded together by collagen fibrils at their contiguous surfaces to form a unitary structure.

5. A tanned collagenous film according to claim 4.

References Cited

UNITED STATES PATENTS

| | | | |
|---|---|---|---|
| 1,281,467 | 10/1918 | Wise et al. | 128—335.5 X |
| 2,598,608 | 5/1952 | Salo et al. | 260—117 |
| 2,934,446 | 4/1960 | Highberger et al. | 106—155 |
| 3,114,372 | 12/1963 | Griset et al. | 128—335.5 |

FOREIGN PATENTS 851,720   10/1960   Great Britain.

DALTON L. TRULUCK, *Primary Examiner.*